April 26, 1932. H. R. SAVIDGE 1,855,843

HORSESHOE

Filed May 5, 1931

INVENTOR.
Hiram R. Savidge

BY Lancaster, Allwine & Rommel
ATTORNEYS.

Patented Apr. 26, 1932

1,855,843

UNITED STATES PATENT OFFICE

HIRAM R. SAVIDGE, OF MONTGOMERY, PENNSYLVANIA

HORSESHOE

Application filed May 5, 1931. Serial No. 535,223.

This invention relates to horseshoes and particularly to a soft-tread horseshoe.

An object of the invention is to provide a soft-tread horseshoe which will not ball in winter nor catch stones and the like.

Another object is to provide a horseshoe of this character having a large tread surface for contact with the street or roadway, preventing slipping.

A further object is to provide a soft-tread horseshoe having an insert which fully cushions the hoof and tends to protect persons against injury inflicted by kicking horses and protects the roadbed against undue damage.

A still further object is to provide a soft-tread horseshoe, the metal main body portion of which is attached to the hoof with a rubber insert out of contact with the hoof, thus protecting the horse from drawing due to the rubber insert.

One other object is to provide a yieldable insert for soft-tread horseshoes which is strongly built and reinforced, insuring long wear.

Other objects and advantages of the invention will be apparent during the course of the following detailed description taken in connection with the accompanying drawings, forming a part of this specification, and in which drawings:—

Referring to the drawings in detail, and wherein similar reference characters designate corresponding parts thruout the several views, the letter A designates the main body portion, carrying the cushion insert B.

Figure 1:
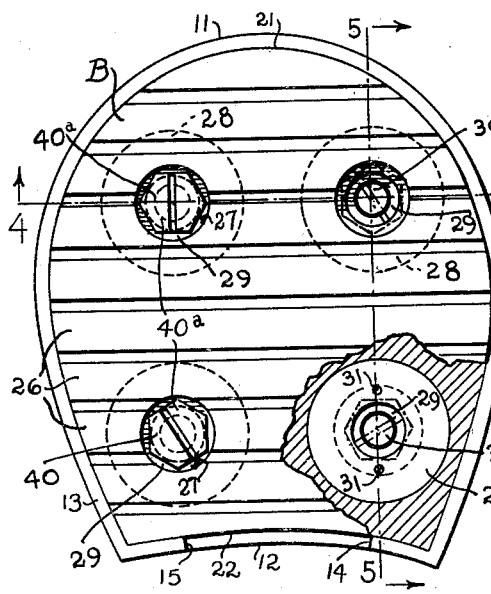
Figure 1 is a bottom plan view of the improved soft-tread horseshoe assembled, a part being broken away in order to illustrate details of construction.
Figure 2:
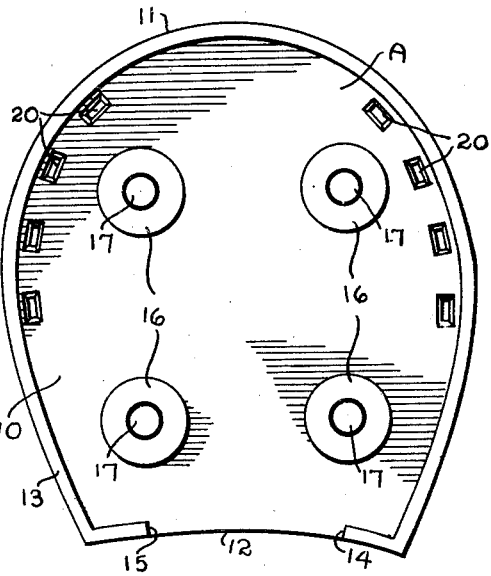
Figure 2 is a plan of one face of the main body portion of the horseshoe.
Figure 3:
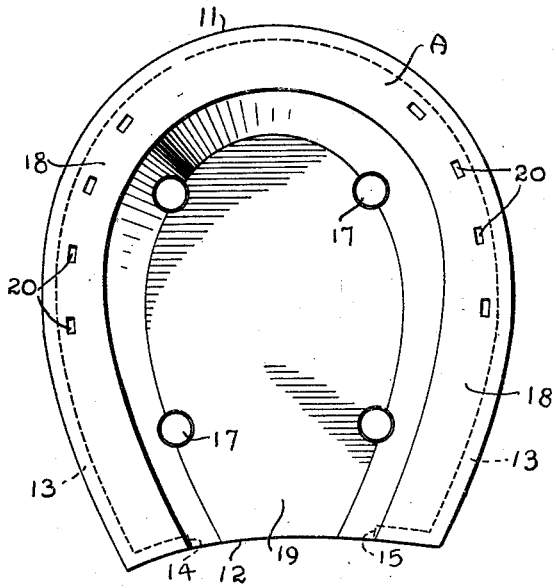
Figure 3 is a plan of the opposite face.

Referring first to the main body portion A, it may comprise a plate 10 having a substantially flat cushion insert receiving face on one side and having an outline like that of a horse's hoof, presenting a front curve 11 and a rear curve 12. This main body portion is designed to cover substantially all the bottom of the horse's hoof. A preferably narrow depending flange or retainer 13 follows the greater portion of the edge of the plate 10 but may end along the rear curve as shown at 14 and 15 in Figure 2. Thus the flange 13 and face form a recess for receiving the cushion insert. Spaced from the edge of the plate 10 are circular bosses 16 projecting from the flat face having openings or sockets 17 which are preferably screw-threaded. These bosses have a height substantially equal to the height of the flange. The opposite side of the plate 10 has a substantially flat outer portion 18 and a beveled recess 19, the outer portion and the recess being provided to fit a horse's hoof. Suitable nail holes 20 are provided in the plate 10 including horseshoe nail-head receiving recesses. The main body portion A may be of metal alloy from which a light but strong casting can be made, and it will be seen that in the construction of this main body portion I have provided a member which will substantially cover the entire bottom of a horse's hoof.

As to the cushion insert B, the same preferably has sides 21 shaped to fit within the flange 13, bridging the space between the ends 14 and 15 of the flange as shown at 22. The inner face 23 of this insert is flat, having recesses 24 of a circumference substantially equal to the circumference of the bosses 16, and when the insert is in position the face 23 will abut the flat face of the plate 10 of the main body portion. The outer face 25 may have ribs 26 to aid in preventing slipping. Recesses 27 project into the outer face and are provided to accommodate attaching means such as screws 40 having heads 40ª or the flanges 42 of calks 41. The center of the recess 27 is located directly over the center of the recess 24. At the base of each recess 27 is a washer 28 which is embedded in the insert and forms an abutment 29 between the hole 30 in the center of the washer and the wall of the recess. The washers have a circumference larger than the circumference of either the recesses 24 or 27 and may have holes 31 thru their surfaces spaced from the hole 30 so that the substance making up the insert when plastic may flow into the holes and anchor the washers against rotation. Preferably I will employ rubber in the composition of the insert using metal washers, but other yieldable or elastic material for the insert will do, and a less yieldable or less elastic material may be used for the washers. The object of the washers is to provide an abutment more solid than rubber or the like, so that the insert will not be apt to be torn from the main body portion. It will be seen that in the construction of the insert I have provided a block insert in contradistinction to an ordinary horeshoe-shaped insert or one having a cutaway central portion. My insert bridges the entire cushion insert-receiving face of the main body portion. Thus I get a larger tread surface and a shorter length of insert edge to become worn and cracked, the extra rubber supplying reinforcement to the portions near the edge.

Figure 5:
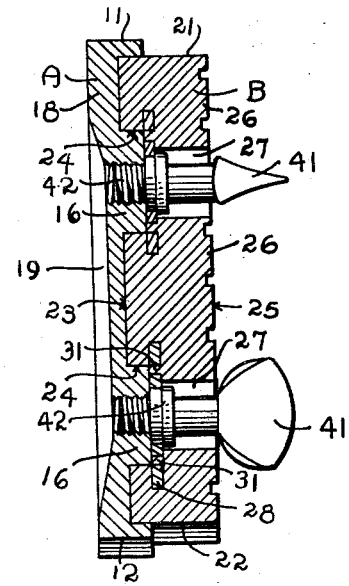
Figure 5 is a section on the line 5—5 of Figure 1, illustrating the use of calks instead of screws to secure the parts together.
Figure 4:
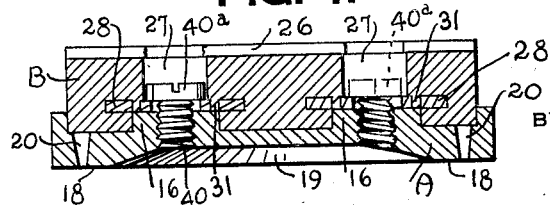
Figure 4 is a section on the line 4—4 of Figure 1.

In using these horseshoes, the main body portion is nailed upon the horse's hoof, using ordinary horseshoe nails. The cushion insert is then inserted in the recess between the flange and over the bosses and screwed fast to the main body portion forcing the bosses against the less yieldable abutment of the rubber insert. The bosses aid in holding the insert against lateral and longitudinal movement and carry the threads for receiving the screws. In renewing the cushion insert, all that is necessary is to unscrew the old insert and apply the new one. In very icy weather, calks can take the place of the screws, as shown in Figure 5.

Changes in detail may be made to the form of invention herein shown and described, without departing from the spirit of the invention or the scope of the following claims.

What is claimed is:

1. In a horseshoe, the combination of a main body portion having an insert-receiving face and a boss projecting from said face, and a main insert of elastic material carried by said main body portion having a recess therein, an abutment insert of less elastic material than said main insert and of greater width than said recess, embedded in said main insert and having a perforation substantially filled by the material of said main insert, anchoring said abutment insert to said main insert, said recess accommodating said boss and permitting said boss to contact with said abutment.

2. In a horseshoe, the combination of a main body portion and a cushion insert therefor comprising a block of rubber, a metal washer embedded within said block, said washer having a main central opening and an auxiliary opening spaced therefrom, said last-mentioned opening rubber filled, preventing said washer from rotating, and means attaching said insert to said main body portion, said means inserted thru said main central opening and contacting with said washer.

3. As an article of manufacture, a cushion insert for soft-tread horseshoes comprising a block of rubber, and an insert embedded in said block of material less yieldable than said block, providing an abutment having a central opening and with an auxiliary opening, said central opening accommodating means to secure said insert to a horse's hoof and providing an abutment for said means, and said auxiliary opening filled with the rubber of said block, anchoring said insert to said block.

HIRAM R. SAVIDGE.